(12) United States Patent
Takagishi et al.

(10) Patent No.: US 8,842,394 B2
(45) Date of Patent: Sep. 23, 2014

(54) MAGNETIC HEAD (71) Applicant: Kabushiki Kaisha Toshiba, Tokyo (JP)

(72) Inventors: Masayuki Takagishi, Kunitachi (JP);
Susumu Hashimoto, Tokyo (JP);
Hitoshi Iwasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/573,675

(22) Filed: Oct. 3, 2012

(65) Prior Publication Data

US 2014/0022668 A1    Jan. 23, 2014

(30) Foreign Application Priority Data

Oct. 3, 2011    (JP) .................. 2011-219319

(51) Int. Cl.
*G11B 5/39* (2006.01)
*G11B 5/11* (2006.01)

(52) U.S. Cl.
CPC ...................................... *G11B 5/11* (2013.01)
USPC ..................................... 360/324.12; 360/319

(58) Field of Classification Search
CPC ............... G11B 5/11; G11B 5/3932; G11B 2005/3996; G11B 5/3116; G11B 5/313; G11B 5/3903
USPC ....................................... 360/324–324.2, 319
See application file for complete search history.

(56) References Cited

U.S. PATENT DOCUMENTS

| | | | |
|---|---|---|---|
| 6,914,760 B2 * | 7/2005 | Gill | 360/324.12 |
| 7,035,062 B1 | 4/2006 | Mao et al. | |
| 7,177,122 B2 | 2/2007 | Hou et al. | |
| 7,467,459 B2 * | 12/2008 | Gill et al. | 29/603.07 |
| 7,869,166 B2 * | 1/2011 | Miyauchi et al. | 360/324.11 |
| 8,031,442 B2 * | 10/2011 | Pinarbasi | 360/324.1 |
| 8,493,694 B2 * | 7/2013 | Zheng et al. | 360/324.12 |
| 2009/0034133 A1 | 2/2009 | Miyauchi et al. | |
| 2011/0026169 A1 * | 2/2011 | Gill et al. | 360/324.12 |

FOREIGN PATENT DOCUMENTS

| | | | |
|---|---|---|---|
| JP | 2007048820 A * | 2/2007 | |
| JP | 2009-032383 | 2/2009 | |
| JP | 2009-087474 | 4/2009 | |
| JP | 2011238342 A * | 11/2011 | |

OTHER PUBLICATIONS

Lamberton, Robert et al ; "Current-in-Plane GMR Trilayer Head Design for Hard-Disk Drives: Characterization and Extendibility"; IEE Transactions on Magnetic; vol. 43; No. 2; pp. 645-650; Feb. 2, 2007.
Office Action dated Sep. 3, 2012 in Japanese Application No. 2011-219319 with English-language translation, 6 pp.

* cited by examiner

*Primary Examiner* — Will J Klimowicz
(74) *Attorney, Agent, or Firm* — Nixon & Vanderhye, P.C.

(57) ABSTRACT

According to one embodiment, a magnetic head includes a magnetoresistive element between a first magnetic shield layer and a second magnetic shield layer, and a hard bias layer between the first magnetic shield layer and the second magnetic shield layer on a side surface of the magnetoresistive element in a first direction intersecting with a second direction which links the first and second magnetic shield layers. The hard bias layer includes Fe or an alloy containing Fe and Co. An aspect ratio (h/w) of the hard bias layer is not smaller than 2, where h is a height of the hard bias layer in the first direction and w is a thickness of the hard bias layer in the second direction.

20 Claims, 12 Drawing Sheets

MAGNETIC HEAD

CROSS-REFERENCE TO RELATED APPLICATIONS

This application is based upon and claims the benefit of priority from Japanese. Patent Application No. 2011-219319, filed Oct. 3, 2011, the entire contents of which are incorporated herein by reference.

FIELD

Embodiments described herein relate generally to a magnetic head.

BACKGROUND

A CPP (Current-Perpendicular-to-Plane)-Tri-layer type magnetic head has been known as a magnetic head used for data read by a magnetic recording/reproducing apparatus such as an HDD (Hard Disk Drive). The CPP-Tri-layer type magnetic head has the following features. First, when there is no external magnetic field from a magnetic recording medium, a hard bias layer makes almost perpendicular the relative magnetization directions of two magnetization free layers which form a magnetoresistive element. Second, the relative magnetization directions of the two magnetization free layers change from almost perpendicular directions to parallel or antiparallel directions by the external magnetic field from the magnetic recording medium. Third, a current perpendicular to the film surface is supplied to the two magnetization free layers to detect the resistance value of the magnetoresistive element, thereby reading data.

At present, signal reproduction of the HDD uses a TMR (Tunneling MagnetoResistive) head in which a current is supplied in a direction perpendicular to the film surface. In the future, miniaturization of a reproducing element is inevitable along with higher recording densities. A magnetoresistive effect element having a low resistance per unit cross sectional area becomes necessary.

For example, it is expected that implementation of a surface recording density of 2 Tb/inch$^2$ requires a reproducing element having an energization cross sectional area of about 20 nm$^2$. A sheet resistance (RA: energization cross sectional area x resistance) of about 0.3 $\Omega\mu m^2$ or lower is required. In the TMR head, a current flows through a tunnel barrier in principle, so reduction of the resistance has a physical limitation. Under the circumstance, new magnetoresistive effect elements having a high magnetoresistive effect change ratio (MR ratio) at a low resistance have been studied enthusiastically. To increase the recording density of the HDD, the magnetoresistive effect element needs to be downsized.

For example, to implement high-resolution reproduction, the reproducing shield interval needs to be 20 nm or smaller at a surface recording density of 2 Tb/inch$^2$ or higher, and 15 nm or smaller at 3 Tb/inch$^2$. Further, to implement high-track-density reproduction at these recording densities, a magnetization free layer requires a width of about 15 to 20 nm. However, a current TMR head is formed from an antiferromagnetic film (IrMn alloy), a magnetization pinned layer, an intermediate insulating layer, and a magnetization free layer. It is therefore difficult to decrease the total thickness to 15 to 20 nm or smaller and interpose the TMR head between reproducing shields.

To solve this, a so-called Trilayer structure having two magnetization free layers without using an antiferromagnetic film has been examined. This structure is considered to be able to decrease the thickness to almost 10 nm because there is no antiferromagnetic film.

DETAILED DESCRIPTION

In general, according to one embodiment, a magnetic head comprises: a first magnetic shield layer and a second magnetic shield layer; a magnetoresistive element interposed between the first magnetic shield layer and the second magnetic shield layer; and a hard bias layer interposed between the first magnetic shield layer and the second magnetic shield layer on a side surface of the magnetoresistive element in a first direction intersecting with a second direction which links the first and second magnetic shield layers, wherein the magnetoresistive element includes a first magnetization free layer and second magnetization free layer having variable magnetization, and a nonmagnetic layer between the first magnetization free layer and the second magnetization free layer, magnetization directions of the first magnetization free layer and the second magnetization free layer are in a substantially perpendicular state by a magnetic field from the hard bias layer with no external magnetic field, the hard bias layer includes Fe or an alloy containing Fe and Co, an aspect ratio (h/w) of the hard bias layer is not smaller than 2, where h is a height of the hard bias layer in the first direction and w is a thickness of the hard bias layer in the second direction, and thickness w of the hard bias layer is smaller than gap G between the first magnetic shield layer and the second magnetic shield layer.

An embodiment will now be described in detail with reference to the accompanying drawings.

Figure 1:
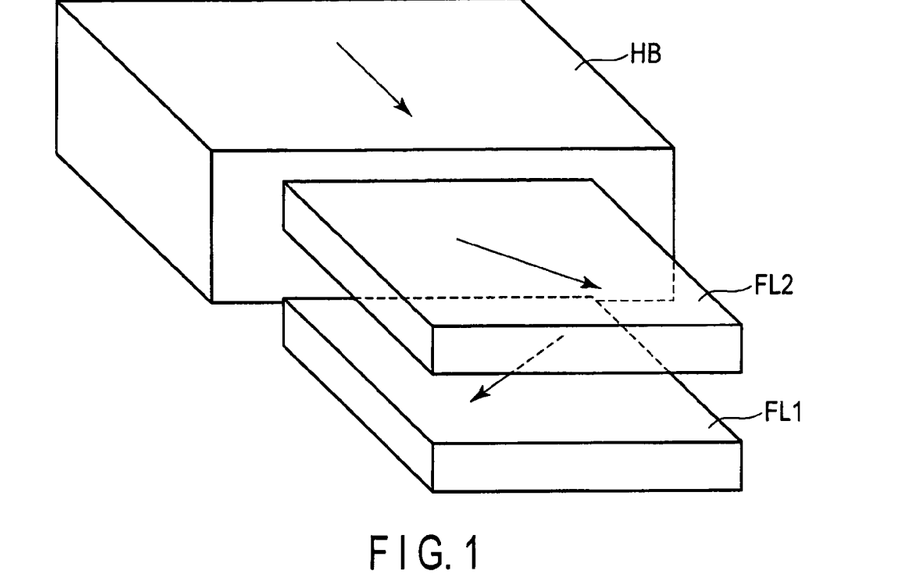
FIG. 1 is a view showing a CPP-Tri-layer type magnetic head.

FIG. 1 shows the main part of a CPP-Tri-layer type magnetic head.

When there is no external magnetic field from a magnetic recording medium (e.g., magnetic disk), the relative magnetization directions of two magnetization free layers FL1 and FL2 each having a variable magnetization direction are set to be in a substantially perpendicular state by hard bias layer HB.

The relative magnetization directions of two magnetization free layers FL1 and FL2 change their states from the substantially perpendicular state to parallel or antiparallel directions by the external magnetic field from the magnetic recording medium.

In this specification, the substantially perpendicular state means that the angle θ defined by the magnetization directions of two magnetization free layers FL1 and FL2 falls within a range of 60°<θ<120°.

The parallel directions mean directions in which the angle θ defined by the magnetization directions of two magnetization free layers FL1 and FL2 decreases from that in the substantially perpendicular state. The antiparallel directions mean directions in which the angle θ defined by the magnetization directions of two magnetization free layers FL1 and FL2 increases from that in the substantially perpendicular state.

Note that an angle of 0° is a state in which the magnetization directions of two magnetization free layers FL1 and FL2 are completely the same. An angle of 180° is a state in which the magnetization directions of two magnetization free layers FL1 and FL2 are completely opposite.

Figure 2:
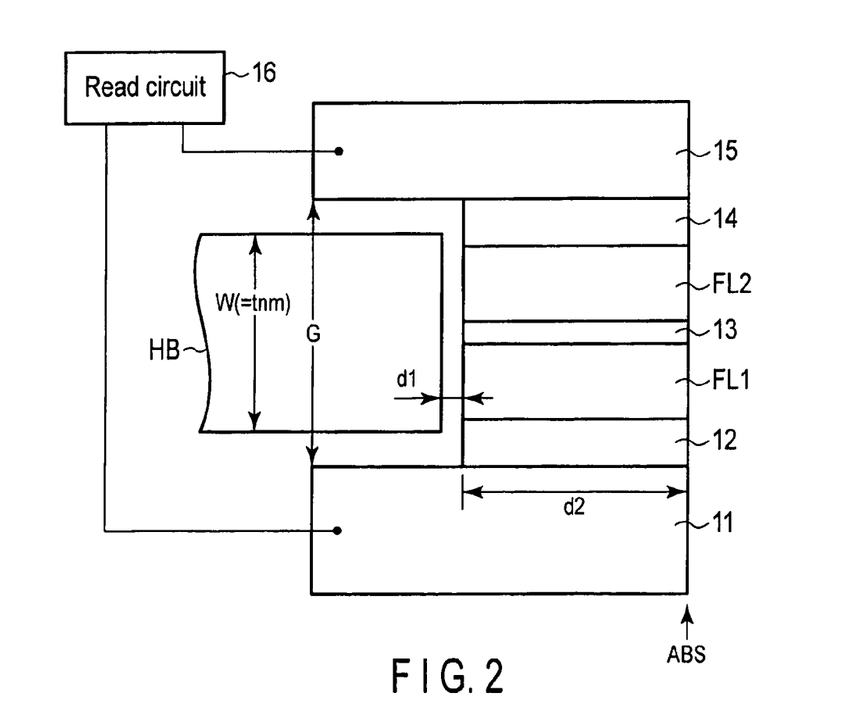
FIG. 2 is a sectional view showing the magnetic head in FIG. 1.

FIG. 2 is a sectional view showing the magnetic head in FIG. 1.

Seed layer 12 is formed on magnetic shield layer 11. Magnetization free layer FL1 is formed on seed layer 12. Nonmagnetic layer 13 is formed on magnetization free layer FL1. Magnetization free layer FL2 is formed on nonmagnetic layer 13. Capping layer 14 is formed on magnetization free layer FL2. Magnetic shield layer 15 is formed on capping layer 14.

Seed layer 12 is formed to control the crystal orientations of magnetization free layers FL1 and FL2 and nonmagnetic layer 13, and the like. Capping layer 14 is used to protect magnetization free layer FL2 not to directly contact another substance.

Read circuit 16 is connected between two magnetic shield layers 11 and 15. In this example, two magnetic shield layers 11 and 15 also function as electrodes.

Read circuit 16 reads the resistance value of a magnetoresistive element (magnetization free layers FL1 and FL2 and nonmagnetic layer 13) whose magnetization has changed from the substantially perpendicular state to parallel or antiparallel directions by an external magnetic field, when a current flows between two magnetic shield layers 11 and 15.

In this example, two magnetic shield layers 11 and 15 are used as electrodes. However, electrodes for data read may be arranged separately from two magnetic shield layers 11 and 15.

In FIG. 2, ABS is the air bearing surface of the magnetic head (magnetoresistive element). The air bearing surface means a surface of the magnetoresistive element on which a magnetic recording medium is arranged when reading data from the magnetic recording medium using the magnetic head.

To read data from a high-recording-density magnetic recording medium by the magnetic head, it is necessary to downsize the magnetoresistive element, that is, decrease gap G between two magnetic shield layers 11 and 15.

For example, gap G needs to be 15 nm or smaller at a recording density of 3 Tb/inch$^2$ on the HDD.

In this case, thickness w of hard bias layer HB needs to be 12 nm or smaller in consideration of the margin between two magnetic shield layers 11 and 15, particularly, the thickness of the seed layer serving as the underlayer of hard bias layer HB and that of an insulating layer for ensuring insulation from the seed layer.

However, thickness w of hard bias layer HB affects the relative magnetization directions of two magnetization free layers FL1 and FL2 when there is no external magnetic field from the magnetic recording medium.

This will be explained below.

Figure 3:
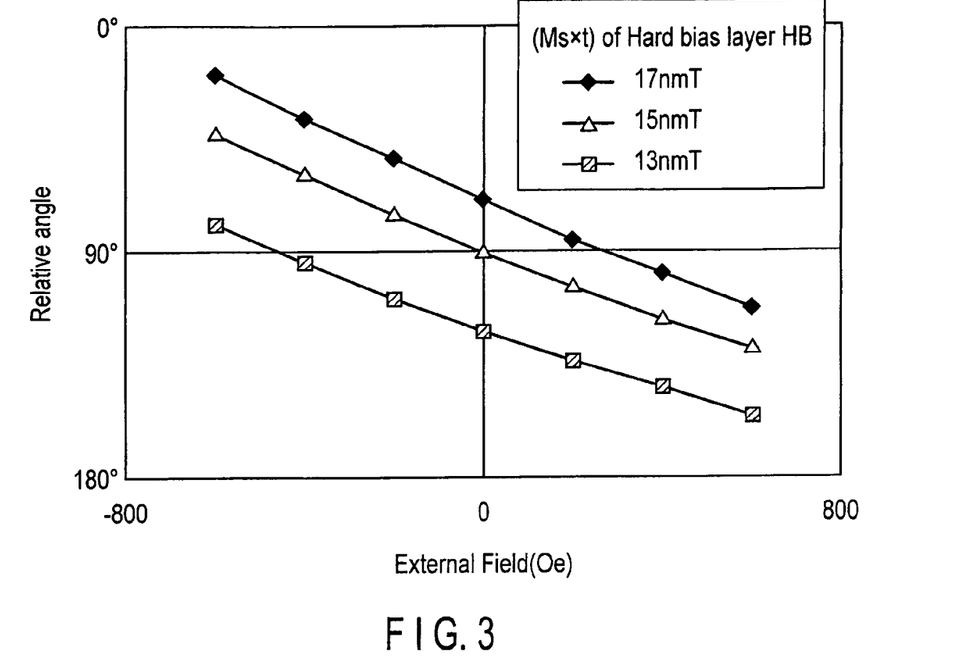
FIG. 3 is a graph showing the relationship between the external magnetic field and the magnetization directions of two magnetization free layers.

FIG. 3 shows the relationship between an external magnetic field and the relative magnetization directions of magnetization free layers FL1 and FL2 using, as a parameter, the product (Ms×t) of saturation magnetization Ms of the hard bias layer and t serving as thickness w of the hard bias layer.

Assume that hard bias layer HB is made of CoPt. Distance d1 between hard bias layer HB and magnetization free layers FL1 and FL2 is 3 nm, and size d2 of magnetization free layers FL1 and FL2 is 16 to 28 nm.

As is apparent from FIG. 3, when the product (Ms x t) of saturation magnetization Ms (T: tesla) and thickness t (nm) of the hard bias layer is almost 15 nmT, the relative magnetization directions of two magnetization free layers FL1 and FL2 in the absence of an external magnetic field becomes almost perpendicular) (90°.

However, saturation magnetization Ms of CoPt serving as hard bias layer HB is 1 to 1.2 T. To obtain Ms×t of about 15 nmT, thickness w (=t nm) of hard. bias layer HB needs to be a value within a range of 12.5 to 15 nm.

Thickness w of hard bias layer HB exceeds the thickness upper limit of 12 nm which is the above-described requirement. For this reason, hard bias layer HB cannot fit in gap G between the two magnetic shield layers.

If hard bias layer HB is forcibly fitted in gap G, gap G of an area where hard bias layer HB is arranged needs to be partially widened. In this case, almost all the magnetic field applied from the hard bias at the portion wider than the original gap is absorbed by the shield, and the hard bias does not function. The shape of the partially widened shield becomes complicated, and a change of the magnetization also becomes complicated, generating noise and greatly degrading a reproduction signal.

Considering this, a CPP-Tri-layer type magnetic head in the embodiment adopts, as hard bias layer HB, Fe or an alloy (soft magnetic material) mainly containing Fe and Co.

For example, when hard bias layer HB is made of CoFe, saturation magnetization Ms of CoFe is about 2 T. To obtain Ms x t of about 15 nmT, thickness w (=t nm) of hard bias layer HB suffices to be about 7.5 nm.

Note that the product (Ms x t) of the saturation magnetization and thickness of hard bias layer HB is desirably three times or more of the product of saturation magnetization Ms and thickness t of magnetization free layer FL1, and three times or more of the product of saturation magnetization Ms and thickness t of magnetization free layer FL2.

When Fe or an alloy mainly containing Fe and Co is employed as hard bias layer HB, hard bias layer HB can be fitted with a margin in gap G between the two magnetic shield layers, implementing a compact CPP-Tri-layer type magnetic head.

However, even if hard bias layer HB satisfactorily fits in narrow gap G in the CPP-Tri-layer type magnetic head, no compact CPP-Tri-layer type magnetic head can be truly implemented unless a new problem arising from making hard bias layer HB of Fe or an alloy (soft magnetic material) mainly containing Fe and Co is solved.

This problem will be explained below.

Figure 4:
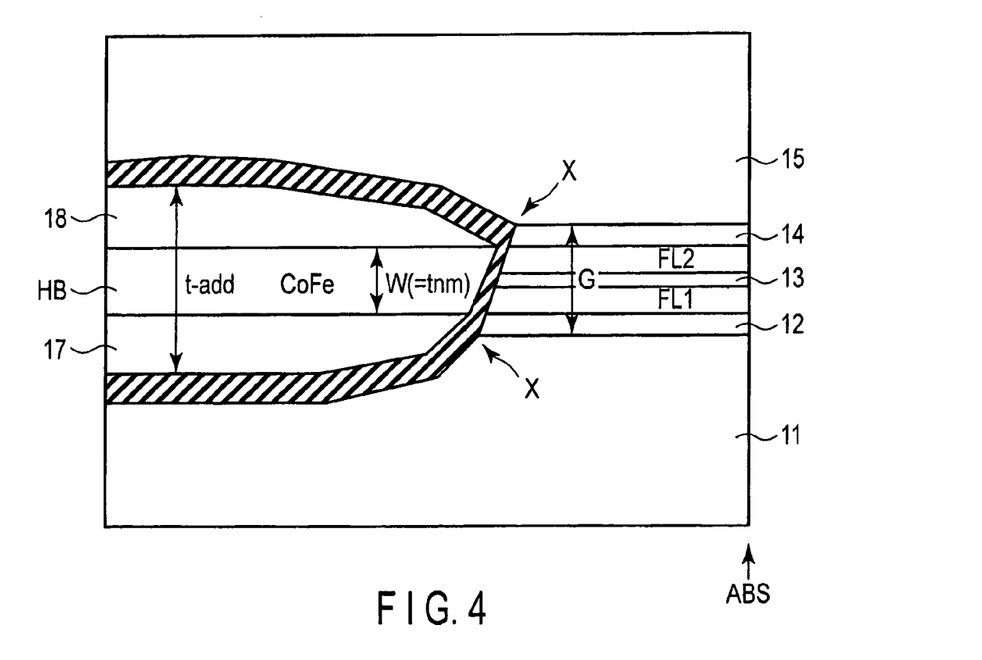
FIG. 4 is a view showing the device structure of a magnetic head.

FIG. 4 shows the device structure of a CPP-Tri-layer type magnetic head using a soft magnetic material as the hard bias layer.

The device structure in this example is different from that in FIG. 2 in that antiferromagnetic layers (e.g., IrMn or PtMn) 17 and 18 are added below and above hard bias layer HB to stabilize the magnetization of hard bias layer (e.g., CoFe) HB.

The remaining structure is the same as the device structure in FIG. 2. Hence, the same reference numerals as those in FIG. 2 denote the same parts, and a description thereof will not be repeated.

As is apparent from FIG. 4, this structure newly requires very thick antiferromagnetic layers 17 and 18 though hard bias layer HB becomes thin. Total thickness t-add of hard bias layer HB and antiferromagnetic layers 17 and 18 becomes larger than gap G between two magnetic shield layers 11 and 15.

As already described above, the device structure in this example means that gap G of the area where hard bias layer HB is arranged is partially widened. Therefore, this device structure does not solve the problem of degradation of a reproduction signal. The degradation of a reproduction signal will be described in more detail.

If the structure in this example is adopted, corners X of antiferromagnetic layers 17 and 18 are formed at boundaries between hard bias layer HB and the magnetoresistive element. Corners X make the magnetic domains of antiferromagnetic layers 17 and 18 unstable. The unstable magnetic domains serve as a cause of noise in data read by the magnetic head, decreasing the SNR (Signal-to-Noise Ratio) ratio.

From this, all the problems can be solved and the CPP-Tri-layer type magnetic head can be downsized by stabilizing the magnetization of hard bias layer HB including Fe or an alloy (soft magnetic material) mainly containing Fe and Co without using an antiferromagnetic layer.

Requirements to achieve this will be examined.

Figure 5:
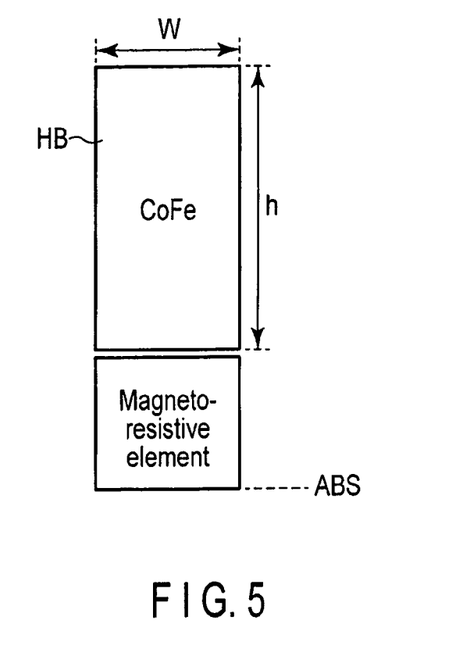
FIG. 5 is a view showing the definition of the aspect ratio.
Figure 6:
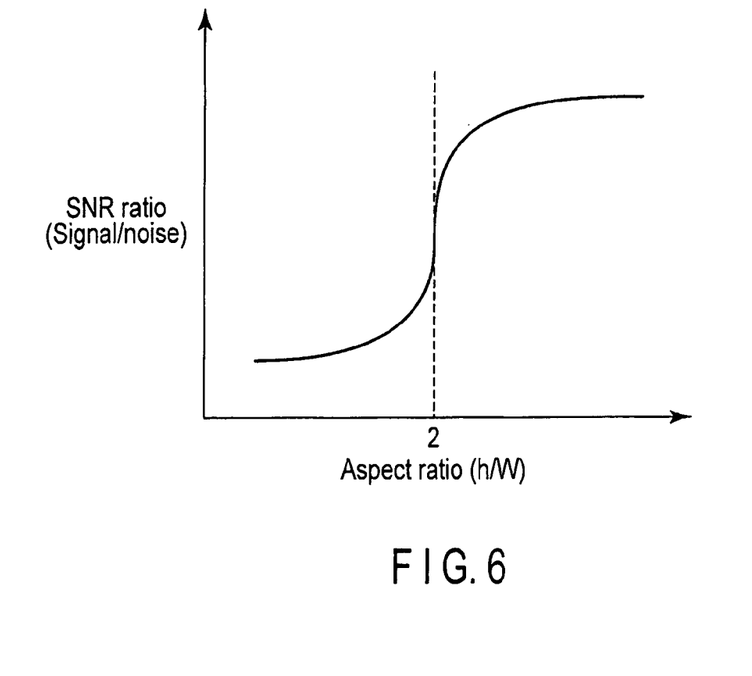
FIG. 6 is a graph showing the relationship between the aspect ratio and the SNR ratio.

FIGS. 5 and 6 show the result of considering the relationship between the shape of hard bias layer HB and the magnetization stability.

First, the shape of hard bias layer HB is defined by the aspect ratio. The aspect ratio of hard bias layer HB is the ratio (h/w) of height h to thickness w of hard bias layer HB. Height h of hard bias layer HB is a size of hard bias layer HB in a direction in which hard bias layer HB and the magnetoresistive element are aligned.

The influence on the SNR ratio of the magnetic head when the aspect ratio of hard bias layer HB is changed will be examined. The SNR ratio of the magnetic head depends on the magnetization stability of hard bias layer HB. When the magnetization of hard bias layer HB is unstable, noise in data read increases, decreasing the SNR ratio. Degradation by noise is correlated with a kink amount appearing on the relationship (RH curve) between an external magnetic field applied to the reproducing head and the resistance of the reproducing head.

Figure 7:
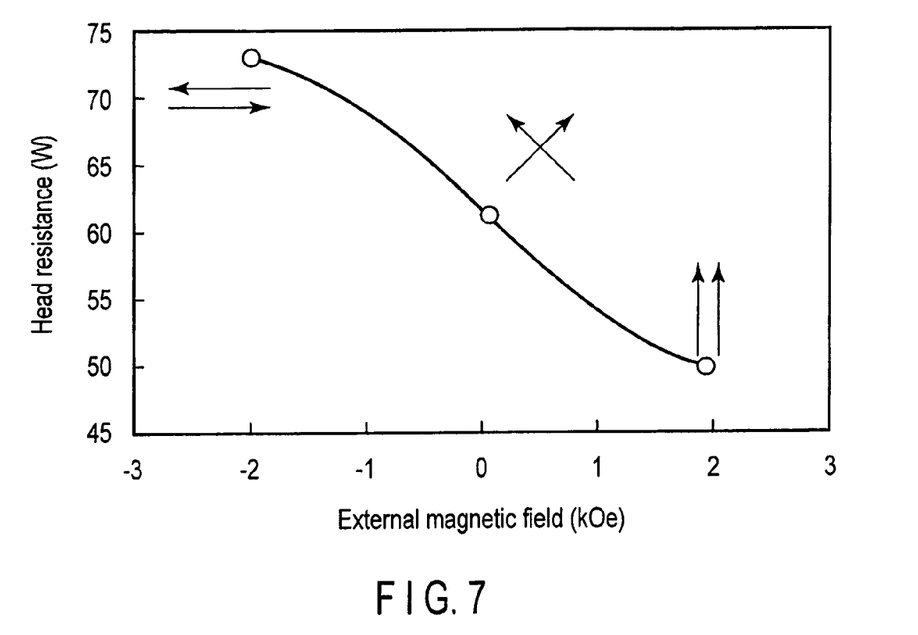
FIGS. 7 and 8 are graphs showing the relationship between the external magnetic field and the head resistance.

When a satisfactory external magnetic field is applied, the head resistance changes from a state in which two magnetization free layers are parallel to a state in which they are antiparallel. On the RH curve, this change corresponds to a change from a lower right position (parallel magnetization state) to an upper left position (antiparallel magnetization state) in FIG. 7. The kink amount appearing on the RH curve will be explained with reference to FIG. 8.

Figure 8:
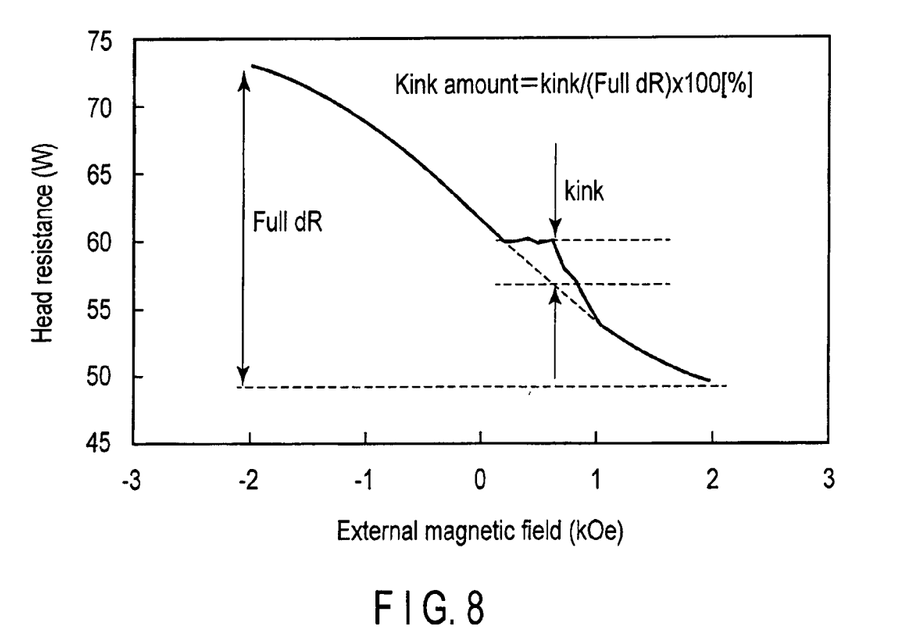

In FIG. 8, "kink" represents a deviation from a general RH curve. If the hard bias is unstable, a kink appears on the RH curve in this manner. A value obtained by dividing this amount by the maximum change amount (Full dR in FIG. 8) of the resistance is defined as a kink amount.

Figure 9:
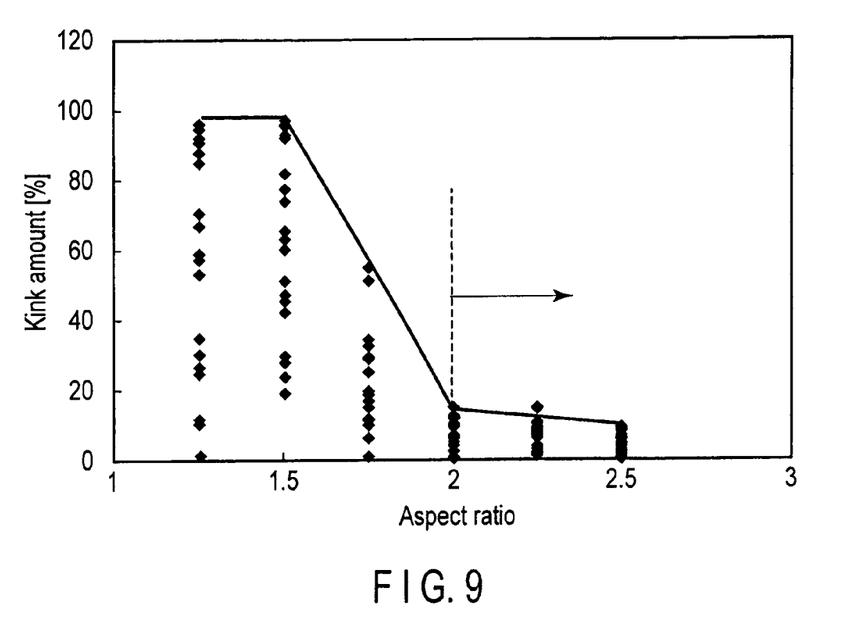
FIG. 9 is a graph showing the relationship between the aspect ratio and the kink amount.

FIG. 9 shows the relationship between the kink amount and the aspect ratio of the hard bias. In this example, the total thickness (t-add) of the FeCo alloy and the antiferromagnet (IrMn) is 12 nm. Since the IrMn thickness is small at an aspect ratio of 2 or smaller, the magnetization of the hard bias layer does not stabilize and the kink amount increases. However, the kink amount stabilizes at an aspect ratio of more than 2.

As a result, the SNR ratio changes prominently at the boundary of a point where the aspect ratio of hard bias layer HB is 2, as shown in FIG. 6. Note that this result is the same even when Fe or an alloy mainly containing Fe and Co, other than CoFe, is employed as hard bias layer HB.

Therefore, setting the aspect ratio of hard bias layer HB to be 2 or higher can stabilize the magnetization of hard bias layer HB including Fe or an alloy (soft magnetic material) mainly containing Fe and Co even if the antiferromagnetic layer is thin.

Figure 10:
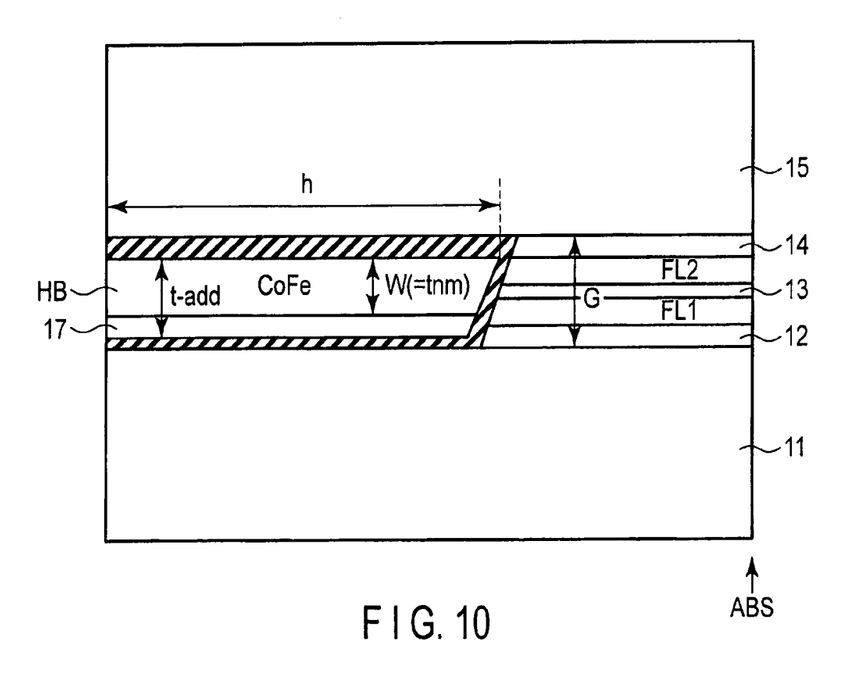
FIGS. 10, 11, and 12 are views showing embodiments of a magnetic head.
Figure 11:
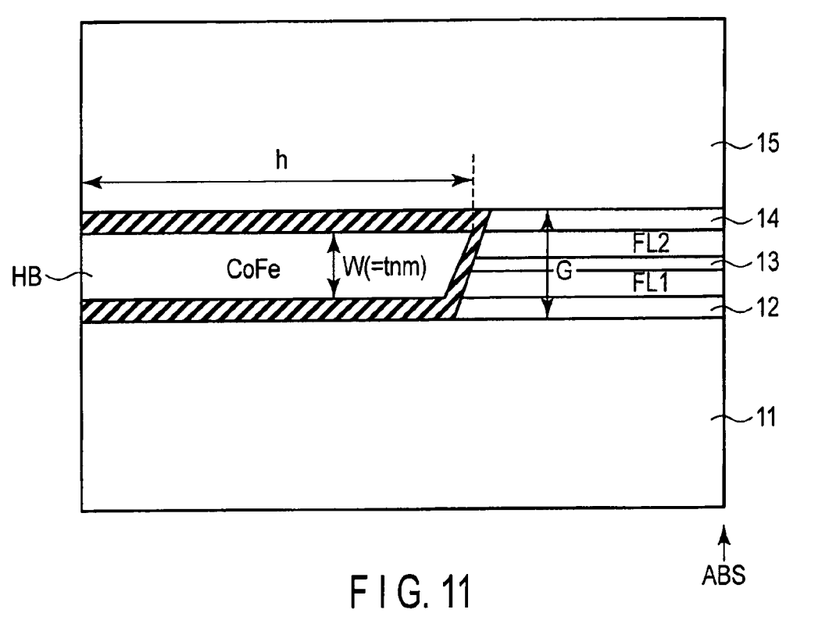
Figure 12:
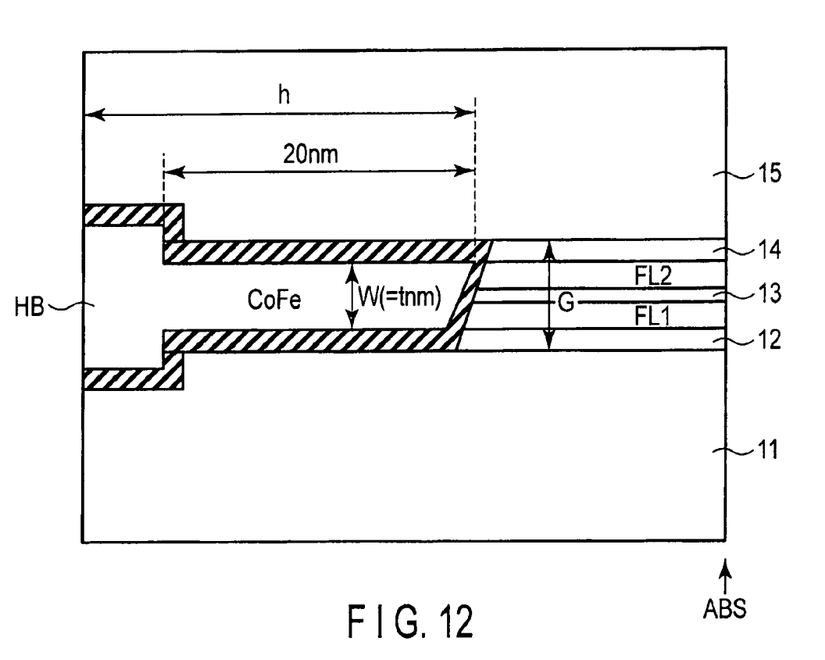

FIGS. 10, 11, and 12 show embodiments of the CPP-Tri-layer type magnetic head.

Gap G between two magnetic shield layers 11 and 15 is equal between an area where the magnetoresistive element is arranged and an area where hard bias layer HB is arranged.

The magnetoresistive element includes seed layer 12, magnetization free layer FL1, nonmagnetic layer 13, magnetization free layer FL2, and capping layer 14.

In the example of FIG. 10, antiferromagnetic layer 17 is added to hard bias layer HB. Although antiferromagnetic layer 17 is arranged below hard bias layer HB in the example of FIG. 10, it may be arranged above or on two sides.

In the example of FIG. 11, no antiferromagnetic layer is added to hard bias layer HB. The magnetization of even a hard bias layer including only a soft magnetic layer as in this example stabilizes as long as the aspect ratio is 2 or higher. In this case, however, low-frequency noise is sometimes observed. This is assumed to be due to a change of the direction of the hard bias at a long time interval.

Figure 13:
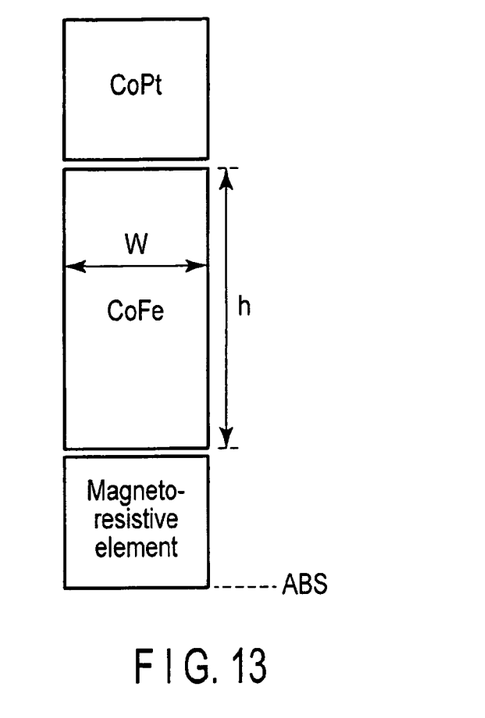
FIG. 13 is a view showing an example of adding a hard magnetic layer to a soft magnetic layer.

This problem is solved by, e.g., arranging a hard magnetic layer behind the soft magnetic layer (height direction), as shown in FIG. 13. The hard bias layer in this case is defined by only the soft magnetic layer, and the stability can be discussed using the ratio of h and w of the soft magnetic layer as the aspect ratio.

The aspect ratio (h/w) of hard bias layer HB is 2 or higher, and thickness w (=t nm) of hard bias layer HB is smaller than gap G (e.g., 15 nm). When CoFe is employed as hard bias layer HB, t=7.5 nm for Ms x t=15 nmT and Ms=2 T. For example, at w=30 nm, h suffices to be 60 nm or larger.

At t=7.5, when antiferromagnetic layer (e.g., IrMn or PtMn) 17 is added to hard bias layer HB, the thickness of antiferromagnetic layer 17 is permitted up to 4.5 nm. In this case, total thickness t-add of hard bias layer HB and antiferromagnetic layer 17 is 12 nm, which can fit in gap G (e.g., 15 nm).

As shown in FIG. 12, when height h of hard bias layer HB is 20 nm or larger, the thickness of hard bias layer HB in an area of 20 nm or larger from an end of hard bias layer HB on the magnetoresistive element side may be larger than thickness w (=t nm) of hard bias layer HB in an area of smaller than 20 nm from the end on the magnetoresistive element side.

For example, the thickness of hard bias layer HB in the area of 20 nm or larger from an end of hard bias layer HB on the magnetoresistive element side may be larger than gap G.

This example will be described with reference to FIGS. 14 and 15.

Figure 14:
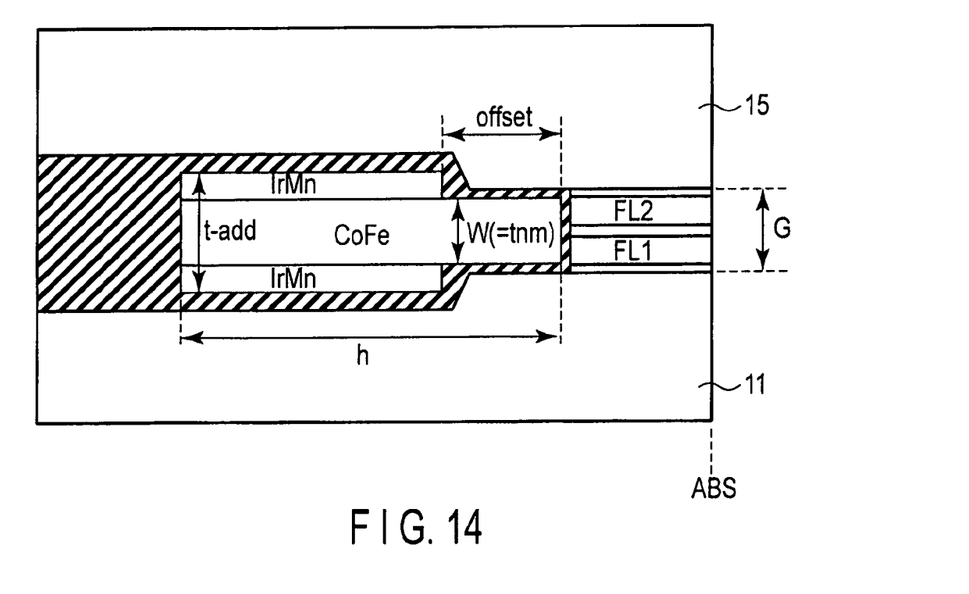
FIG. 14 is a view showing an embodiment of a magnetic head.
Figure 15:
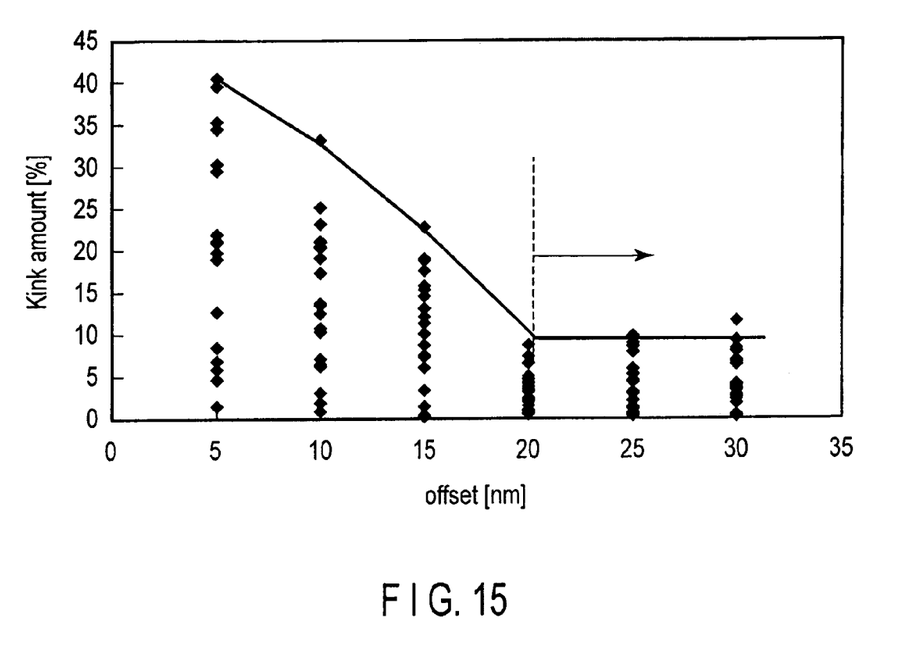
FIG. 15 is a graph showing the relationship between the offset and the kink amount.

In FIG. 14, IrMn is arranged by 4.5 nm above and below HB at a distance of "offset" or larger from an end of hard bias layer HB on the magnetoresistive element side at G=15 nm and t=8 nm. t-add is 18 nm, which does not fit in G. FIG. 15 shows the relationship between the offset amount and the kink amount.

The kink amount becomes constant at an offset of 20 nm or larger. This is because the influence of disturbances of the magnetic domains of hard bias layer HB and magnetic shield layers 11 and 15 on the magnetoresistive element can be reduced in the area of 20 nm or larger from an end of hard bias layer HB on the magnetoresistive element side.

The definitions of w and h which define the aspect ratio will be explained.

Figure 16:
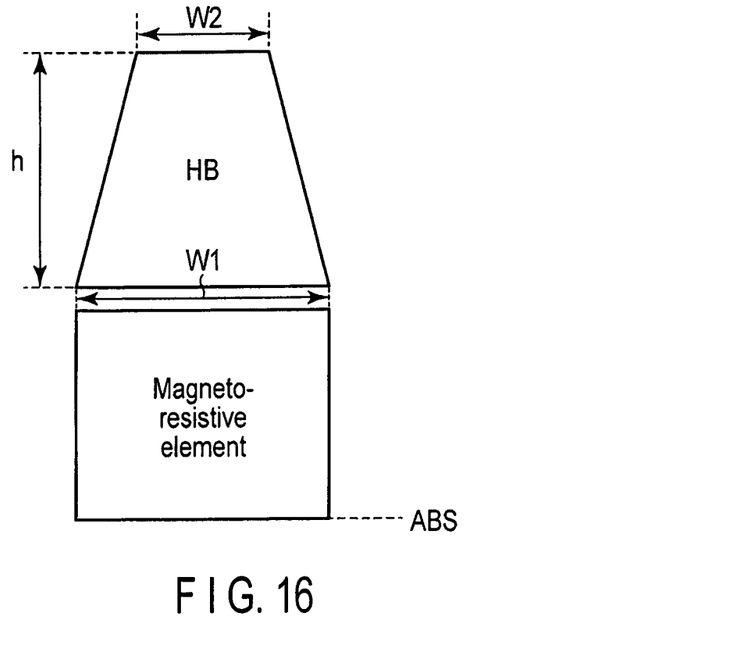
FIGS. 16, 17, 18, and 19 are views showing the shape of a hard bias layer and the aspect ratio.
Figure 17:
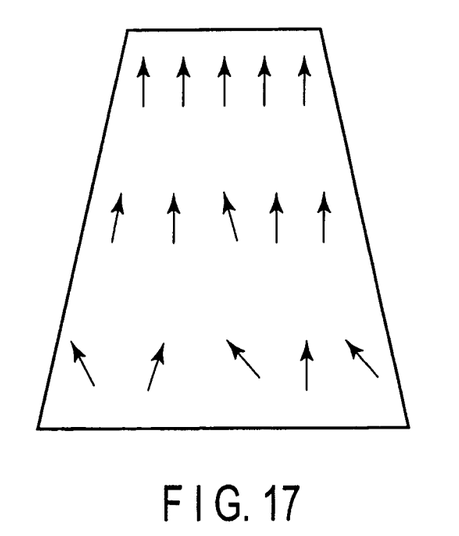

For example, even if width w2 in FIG. 16 is used for the definition of w and h/w is set up to 2, the stability of the hard bias is not ensured. This is because the magnetization is stable at the portion of width w2 but unstable at the portion of width w1 near the magnetoresistive effect element, as shown in FIG. 17. Thus, width w1 of the hard bias layer near the magnetoresistive effect element should be used as w.

Figure 18:
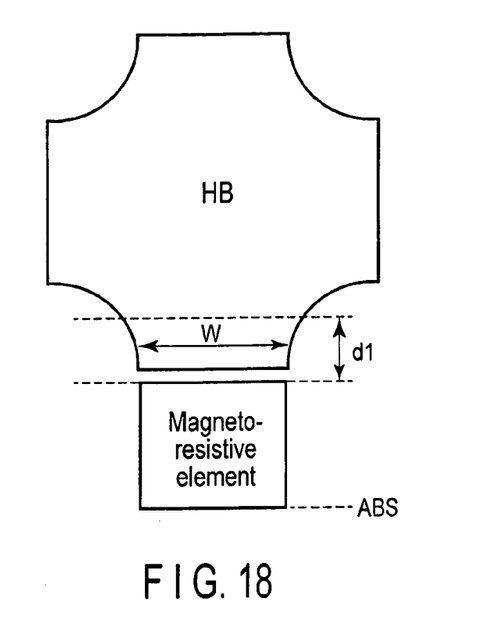
Figure 19:
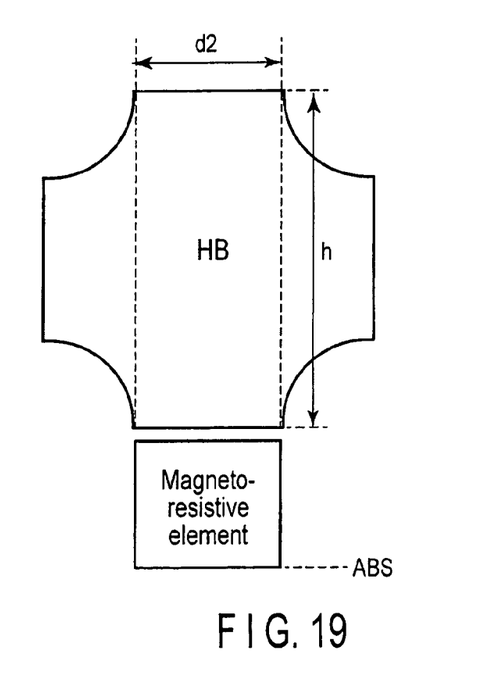

More specifically, the average of widths at distance d1 of 20 nm or smaller from the magnetoresistive effect element is used as w, as shown in FIG. 18. As the definition of h, the average of heights at width d2 of the magnetoresistive effect element is used as h, as shown in FIG. 19.

An HDD will be explained as an example of a magnetic recording/reproducing apparatus to which the CPP-Tri-layer type magnetic head is applied will be described.

Figure 20:
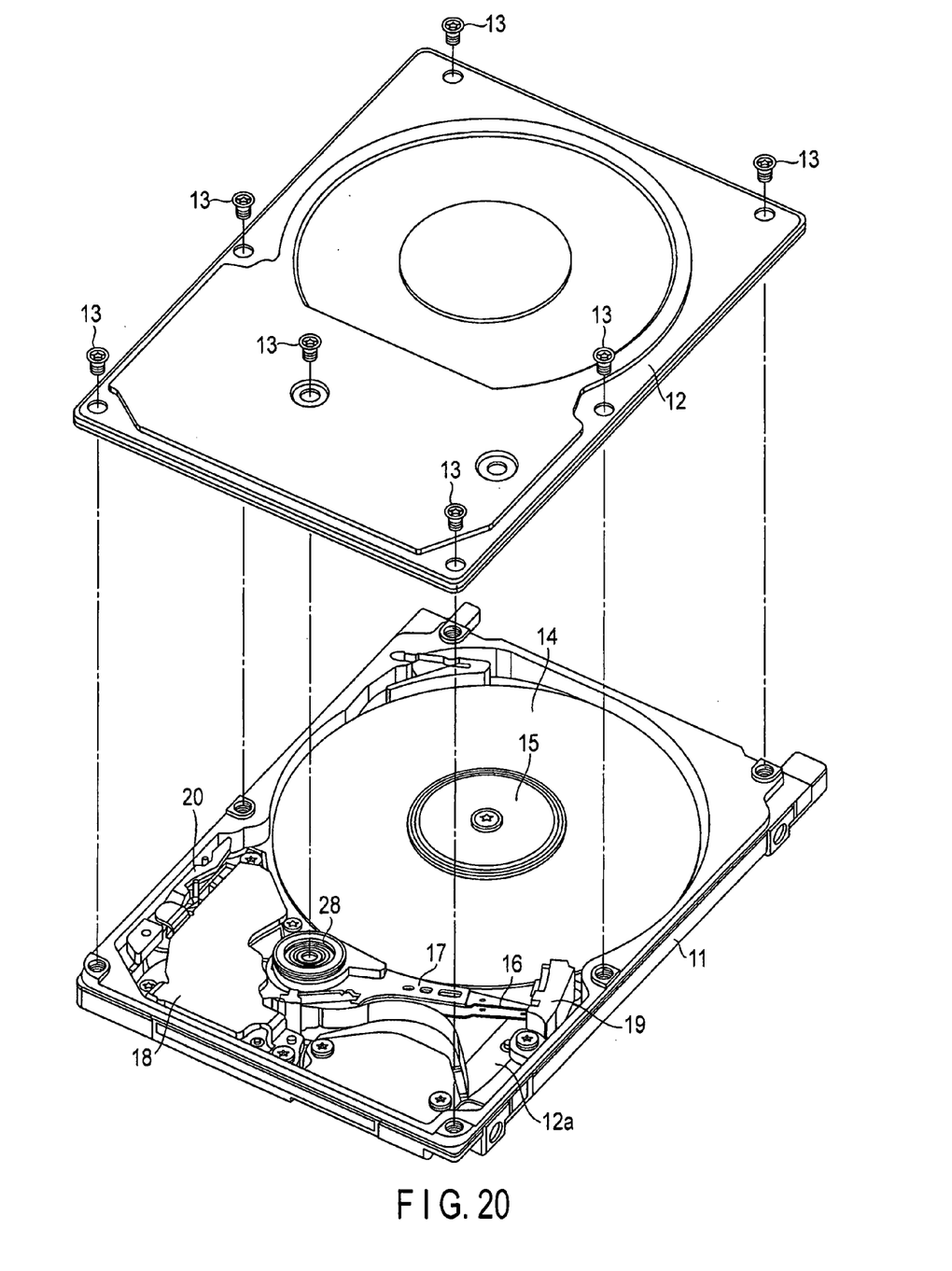
FIG. 20 is a view showing an HDD as an application example.

FIG. 20 shows the internal structure of the HDD when a top cover is removed.

The HDD housing includes box-like base 11 and top cover 12. Base 11 and top cover 12 are coupled by screws 13.

Base 11 includes magnetic disk 14 serving as a magnetic recording medium and spindle motor 15 serving as a driving unit which rotates magnetic disk 14.

Base 11 also includes magnetic heads 16, head stack assembly (to be referred to as HSA hereinafter) 17, voice coil motor (to be referred to as VCM hereinafter) 18, ramp load mechanism 19, and latch mechanism 20.

Magnetic head 16 is the CPP-Tri-layer type magnetic head according to the above-described embodiment. Magnetic head 16 records/reproduces data on/from magnetic disk 14.

HSA 17 supports magnetic head 16, and VCM 18 positions HSA 17. Ramp load mechanism 19 positions HSA 17 when magnetic head 16 moves to the outermost track of magnetic disk 14. Latch mechanism 20 positions HSA 17 upon applying a shock to the HDD housing.

Magnetic disk 14 has, e.g., a circular shape with a diameter of 65 mm (2.5 inches), and includes magnetic recording layers on its upper and lower surfaces. Spindle motor 15 rotates magnetic disk 14 at a predetermined speed, e.g., 5,400 rpm or 7,200 rpm.

Figure 21:
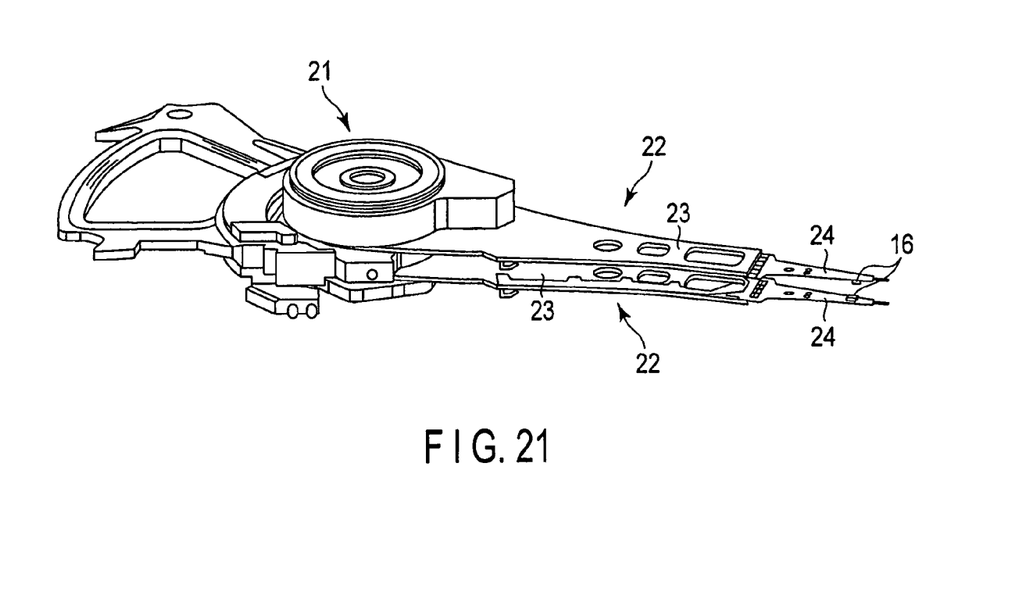
FIG. 21 is a view showing a magnetic head assembly in FIG. 20.

FIG. 21 shows HSA 17 in FIG. 20.

HSA 17 includes rotatable bearing 21, and two head gimbal assemblies (to be referred to as HGAs hereinafter) 22 extending from bearing 21. Each HGA 22 includes arm 23 extending from bearing 21, suspension 24 further extending from arm 23, and magnetic head 16 arranged at the distal end of suspension 24.

Figure 22:
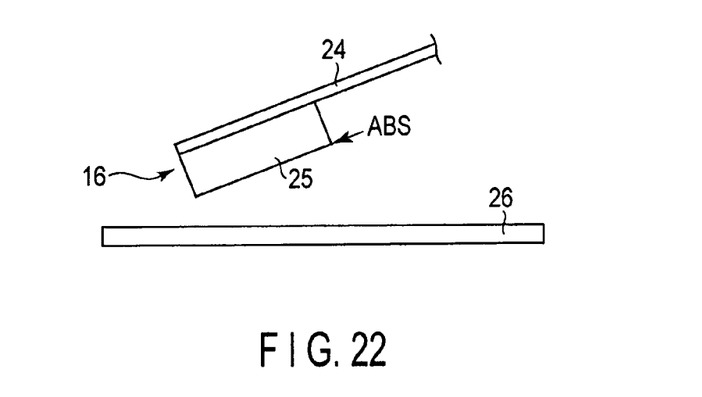
FIG. 22 is a view showing a magnetic head in FIG. 21.

FIG. 22 shows magnetic head 16 in FIG. 21.

Magnetic head 16 includes slider 25, and a recording head and reproducing head which are formed in slider 25. Air bearing surface ABS of the magnetic head according to the above-described embodiment corresponds to air bearing surface ABS in FIG. 22.

An air layer of a predetermined interval (e.g., 2 to 4 nm) is formed between magnetic head 16 and the surface of magnetic recording medium 26.

By applying the magnetic head according to the above-described embodiment to the magnetic head of the HDD, a high-recording-density HDD can be implemented without increasing the manufacturing cost or decreasing the SNR ratio.

The embodiment can implement a compact CPP-Tri-layer type magnetic head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
   a first magnetic shield layer and a second magnetic shield layer;
   a magnetoresistive element interposed between the first magnetic shield layer and the second magnetic shield layer; and
   a hard bias layer interposed between the first magnetic shield layer and the second magnetic shield layer on a side surface of the magnetoresistive element in a first direction intersecting with a second direction which links the first and second magnetic shield layers,
   wherein the magnetoresistive element includes a first magnetization free layer and second magnetization free layer having variable magnetization, and a nonmagnetic layer between the first magnetization free layer and the second magnetization free layer,
   magnetization directions of the first magnetization free layer and the second magnetization free layer are in a substantially perpendicular state by a magnetic field from the hard bias layer with no external magnetic field,
   the hard bias layer includes Fe or an alloy containing Fe and Co,
   an aspect ratio (h/w) of the hard bias layer is not smaller than 2, where h is a height of the hard bias layer in the first direction and w is a thickness of the hard bias layer in the second direction, and
   thickness w of the hard bias layer is smaller than gap G between the first magnetic shield layer and the second magnetic shield layer.

2. The head of claim 1, wherein
   the first magnetic shield layer and the second magnetic shield layer function as electrodes, and
   a resistance value of the magnetoresistive element that is changed from the substantially perpendicular state to parallel or antiparallel directions by an external magnetic field is read, when a current flows between the first magnetic shield layer and the second magnetic shield layer.

3. The head of claim 1, further comprising an antiferromagnetic layer which is interposed between the hard bias layer and the first magnetic shield layer and pins magnetization of the hard bias layer, wherein total thickness t-add of the hard bias layer and the antiferromagnetic layer in the second direction is smaller than gap G between the first magnetic shield layer and the second magnetic shield layer.

4. The head of claim 1, further comprising an antiferromagnetic layer which is interposed between the hard bias layer and the second magnetic shield layer and pins magnetization of the hard bias layer,
wherein total thickness t-add of the hard bias layer and the antiferromagnetic layer in the second direction is smaller than gap G between the first magnetic shield layer and the second magnetic shield layer.

5. The head of claim 1, further comprising:
a first antiferromagnetic layer which is interposed between the hard bias layer and the first magnetic shield layer and pins magnetization of the hard bias layer; and
a second antiferromagnetic layer which is interposed between the hard bias layer and the second magnetic shield layer and pins magnetization of the hard bias layer,
wherein total thickness t-add of the hard bias layer, the first antiferromagnetic layer, and the second antiferromagnetic layer in the second direction is smaller than gap G between the first magnetic shield layer and the second magnetic shield layer.

6. The head of claim 1, wherein
height h of the hard bias layer in the first direction is not smaller than 20 nm,
total thickness t-add of the thickness of the hard bias layer and an antiferromagnetic layer in the second direction in a first area is larger than total thickness t-add of the thickness of the hard bias layer and the antiferromagnetic layer in the second direction in a second area,
total thickness t-add of the thickness of the hard bias layer and the antiferromagnetic layer in the second direction in the first area is smaller than gap G between the first magnetic shield layer and the second magnetic shield layer,
the first area is not smaller than 20 nm from an end of the hard bias layer on the side surface of the magnetoresistive element, and
the second area is smaller than 20 nm from the end of the hard bias layer on the side surface of the magnetoresistive element.

7. The head of claim 6, wherein a product of saturation magnetization Ms and thickness t of the hard bias layer in the second direction in the first area is not smaller than three times of a product of saturation magnetization Ms and thickness t of the first magnetization free layer in the second direction, and is not smaller than three times of a product of saturation magnetization Ms and thickness t of the second magnetization free layer in the second direction.

8. The head of claim 1, further comprising:
a seed layer interposed between the first magnetic shield layer and the magnetoresistive element; and
a capping layer interposed between the second magnetic shield layer and the magnetoresistive element.

9. The head of claim 1, wherein part or all of a gap between the first magnetic shield layer and the second magnetic shield layer in an area where the hard bias layer is arranged is equal to gap G between the first magnetic shield layer and the second magnetic shield layer in an area where the magnetoresistive element is arranged.

10. The head of claim 1, wherein part or all of a gap between the first magnetic shield layer and the second magnetic shield layer in an area where the hard bias layer is arranged is larger than gap G between the first magnetic shield layer and the second magnetic shield layer in an area where the magnetoresistive element is arranged.

11. A magnetic recording/reproducing apparatus comprising:
a magnetic recording medium; and
the head of claim 1, wherein the head is used for reading data from the magnetic recording medium.

12. The apparatus of claim 11,
wherein the magnetic recording medium is a magnetic disk, and
the magnetic disk is driven by a spindle motor.

13. The apparatus of claim 11,
wherein the head is a CPP-Tri-layer type magnetic head.

14. A magnetic head comprising:
a first magnetic shield layer and a second magnetic shield layer;
a magnetoresistive element interposed between the first magnetic shield layer and the second magnetic shield layer; and
a hard bias layer interposed between the first magnetic shield layer and the second magnetic shield layer on a side surface of the magnetoresistive element in a first direction intersecting with a second direction which links the first and second magnetic shield layers,
wherein the hard bias layer includes Fe or an alloy containing Fe and Co,
an aspect ratio (h/w) of the hard bias layer is not smaller than 2, where h is a height of the hard bias layer in the first direction and w is a thickness of the hard bias layer in the second direction, and
thickness w of the hard bias layer is smaller than gap G between the first magnetic shield layer and the second magnetic shield layer.

15. The head of claim 14, wherein the magnetoresistive element includes a first magnetization free layer and second magnetization free layer having variable magnetization, and a nonmagnetic layer between the first magnetization free layer and the second magnetization free layer.

16. The head of claim 15, wherein magnetization directions of the first magnetization free layer and the second magnetization free layer are in a perpendicular state by a magnetic field from the hard bias layer with no external magnetic field.

17. The head of claim 14, wherein
the first magnetic shield layer and the second magnetic shield layer function as electrodes, and
a resistance value of the magnetoresistive element that is changed from a perpendicular state to parallel or anti-parallel directions by an external magnetic field is read, when a current flows between the first magnetic shield layer and the second magnetic shield layer.

18. The head of claim 14, wherein part or all of a gap between the first magnetic shield layer and the second magnetic shield layer in an area where the hard bias layer is arranged is equal to gap G between the first magnetic shield layer and the second magnetic shield layer in an area where the magnetoresistive element is arranged.

19. The head of claim 14, wherein part or all of a gap between the first magnetic shield layer and the second magnetic shield layer in an area where the hard bias layer is arranged is larger than gap G between the first magnetic shield layer and the second magnetic shield layer in an area where the magnetoresistive element is arranged.

20. A magnetic recording/reproducing apparatus comprising:
a magnetic recording medium; and the head of claim 14, wherein the head is used for reading data from the magnetic recording medium.

* * * * *